United States Patent [19]

Shinohara

[11] Patent Number: 5,831,783
[45] Date of Patent: Nov. 3, 1998

[54] POWER SOURCE CONTROL CIRCUIT FOR CONTROLLING AN ELECTRIC POTENTIAL OF A MAGNETIC HEAD AND MEMORY APPARATUS USING SUCH A POWER SOURCE CONTROL CIRCUIT

[75] Inventor: Tohru Shinohara, Kawasaki, Japan

[73] Assignee: Fujitsu Limited, Kawasaki, Japan

[21] Appl. No.: 632,009

[22] Filed: Apr. 15, 1996

[30] Foreign Application Priority Data

Jul. 17, 1995 [JP] Japan ................................. 7-180362

[51] Int. Cl.$^6$ ........................................................ G11B 5/02
[52] U.S. Cl. .............................. 360/67; 360/66; 360/46; 361/212
[58] Field of Search .................... 369/72, 73, 74, 369/126; 361/220, 212; 340/635, 657, 650, 651, 661; 360/67, 68, 46, 60, 66, 113

[56] References Cited

U.S. PATENT DOCUMENTS 5,367,411  11/1994  Nishiyama et al. ..................... 360/66

FOREIGN PATENT DOCUMENTS

| | | |
|---|---|---|
| 60-147901 | 8/1985 | Japan . |
| 60-193102 | 10/1985 | Japan . |
| 63-298801 | 12/1988 | Japan . |
| 2-94103 | 4/1990 | Japan . |
| 4-21916 | 1/1992 | Japan . |
| 5-342533 | 12/1993 | Japan . |
| 6-251338 | 9/1994 | Japan . |

*Primary Examiner*—Aristotelis M. Psitos
*Assistant Examiner*—Alan Faber
*Attorney, Agent, or Firm*—Greer, Burns & Crain, Ltd.

[57] ABSTRACT

A power source control circuit prevents a generation of a spark between a magnetic head and a magnetic disk by accurately controlling an electric potential provided to the magnetic head. A signal processing circuit provides to the magnetic head an intermediate electric potential between a positive source voltage and a negative source voltage supplied by a power source unit. A first circuit provides the positive and negative source voltages to the signal processing circuit. A second circuit controls one of the positive and negative source voltages in response to a reference voltage fed back from the signal processing circuit. The reference voltage is provided from the signal processing circuit to the magnetic head for setting the head at the intermediate electric potential.

17 Claims, 18 Drawing Sheets

POWER SOURCE CONTROL CIRCUIT FOR CONTROLLING AN ELECTRIC POTENTIAL OF A MAGNETIC HEAD AND MEMORY APPARATUS USING SUCH A POWER SOURCE CONTROL CIRCUIT

BACKGROUND OF THE INVENTION

1. Field of the Invention

The present invention generally relates to a power source control circuit and a memory apparatus having such a power control circuit and, more particularly, to a power source control circuit suitable for a magnetic disk apparatus having a magnetoresistive head (hereinafter referred to as an MR head) and a memory apparatus having such a power source control circuit.

A magnetic disk apparatus, which can be used as an external memory device connected to a computer, may use the MR head as a read head so as to increase the recording density of information on a magnetic disk as a recording medium and to improve a reading quality of information on the magnetic disk.

2. Description of the Related Art

In order to read information recorded on a magnetic disk by an MR head, a current is supplied to the MR head. This current generates an electric potential in the MR head. If the magnetic disk as a recording medium has an electric potential different from the electric potential generated in the MR head, that is, if there is a difference in electric potential between the MR head and the magnetic disk, an electric discharge accompanying a spark may be generated between the MR head and the magnetic disk. This may damage the MR head as well as the surface of the magnetic disk. In such a condition, a reliable operation of the magnetic disk apparatus cannot be assured.

In order to eliminate the above-mentioned problem, a first method has been suggested to suppress a generation of the spark by setting the MR head to an intermediate electric potential which is between the electric potential of a power source and the ground potential and also setting the magnetic disk to the same intermediate electric potential. However, in this method, there is a possibility that a noise is generated in the process of generating the intermediate electric potential. Thus, in order to obtain a high-quality output from the MR head, it is necessary to take measures against the noise. Additionally, a circuit processing the output of the MR head is connected to the power source and the ground. The intermediate electric potential provided to the MR head is not equal to the power source voltage. Additionally, there is a difference in characteristics between circuits processing the output of the MR head due to allowable manufacturing tolerances. Accordingly, special care is required to achieve a stable intermediate electric potential which is different from the electric potential of the power source and the ground potential.

A second method has been suggested to provide the intermediate potential to the MR head. In this method, a positive source voltage and a negative source voltage are used. The electric potential of the MR head is set to zero volts (the ground potential) which is the electric potential between the positive source voltage and the negative source voltage. In this case, there is no problem occurring as in the first method mentioned above which problem is related to the difference in electric potential between the MR head and circuits connected to the MR head.

FIG. 1 is a block diagram of a disk drive apparatus having a power source control circuit using the above-mentioned second method. The magnetic disk apparatus comprises a positive-voltage power source 100, a control unit 101 and a disk enclosure 105. The control unit 101 comprises a negative-voltage source circuit 102 and a control circuit 103. The disk enclosure 105 comprises a head IC (HDIC) 106, an MR head 107 and a magnetic disk 108 as a recording medium. The disk enclosure 105 is grounded so that the magnetic disk 108 is set to the ground potential. The HDIC 106 is provided with a positive source voltage +V from the positive-voltage power source 100 and a negative source voltage −V from the negative-voltage source circuit 102.

The control circuit 103 receives an output of the MR head 107 via the HDIC 106, and sends to the MR head 107 various commands such as a write command. The HDIC 106 supplies to the MR head 107 a current used for reading information on the magnetic disk 108. The HDIC 106 also performs amplification of the output of the MR head 107 and a processing of signals for a writing operation.

In this case, the electric potential of the MR head 107 is set to zero volts which corresponds to the ground potential, and the magnetic disk 108 is also set to the ground potential which is equal to zero volts.

FIG. 2 is a diagram for showing a relationship between the positive source voltage +V, the negative source voltage −V and a reference voltage Vr. The reference voltage Vr is the voltage actually provided to the MR head 107. The reference voltage Vr is a sum of the positive source voltage +V and the negative source voltage −V. Since characteristics of each negative-voltage source circuit 102 and each HDIC 106 is different from one another due to their allowable manufacturing tolerances, the voltage actually provided to the MR head 107 may slightly differ from one magnetic disk drive to another. This causes an undesirable difference dV between the reference voltage Vr and the ground potential which is equal to zero volts. This creates a difference in electric potential between the MR head 107 which is provided with the reference voltage Vr and the magnetic disk 108 which is set to the ground potential. Additionally, the characteristics of the negative-voltage source circuit 102 and the HDIC 106 slightly changes as time elapses. This may also crate a difference in an electric potential between the MR head 107 and the magnetic disk 108. Accordingly, the second method still has a problem in that a spark is generated between the MR head 107 and the magnetic disk 108. As mentioned above, if a spark is generated between the MR head 107 and the magnetic disk 108, the MR head 107 as well as a surface of the magnetic disk 108 may be damaged. Thus, a reliable operation of the magnetic disk apparatus cannot be assured.

SUMMARY OF THE INVENTION

It is a general object of the present invention to provide an improved and useful power source control circuit and memory apparatus in which the above-mentioned problems are eliminated.

A more specific object of the present invention is to provide a power source control circuit which can prevent a generation of a spark between a magnetic head and a recording medium by accurately controlling an electric potential provided to the magnetic head.

In order to achieve the above-mentioned objects, there is provided according to one aspect of the present invention a power source control circuit for driving a signal processing circuit providing to a head an intermediate electric potential between a positive source voltage and a negative source voltage supplied by power source means, the power source control circuit comprising:

a first circuit for providing the positive and negative source voltages to the signal processing circuit; and a second circuit for controlling one of the positive and negative source voltages in response to a reference voltage fed back from the signal processing circuit, the reference voltage being provided from the signal processing circuit to the head for setting the head at the intermediate electric potential.

According to the above-mentioned power source control circuit, the electric potential of the head is set accurately to a predetermined voltage corresponding to the intermediate electric potential (zero volts) even if characteristics of each power source circuit corresponding to the power source means and each signal processing circuit is different from one another due to their allowable manufacturing tolerances. Additionally, the reference voltage provided to the head can be accurately set to a predetermined voltage corresponding to the intermediate electric potential (zero volts) even if the characteristics of each power source circuit corresponding to the power source means and each signal processing circuit slightly change as time elapses. As a result, a generation of a spark between the head and a recording medium which is set at the intermediate electric potential is prevented. Thus, a reliable operation of the head can be assured.

The above-mentioned power source control circuit may further comprise adjusting means for controlling a timing for supplying the positive source voltage and the negative source voltage to the signal processing circuit. One of the positive and negative source voltages may stabilize faster than the other one of the positive and negative source voltages after the power source means is turned on, and the adjusting means may allow the faster one of the positive and negative source voltages to be supplied to the signal processing circuit after the other one of the positive and negative source voltages falls into a predetermined range. The adjusting means may gradually raise the faster one of the positive and negative source voltages when the faster one of the positive and negative source voltages is supplied to the signal processing circuit.

Additionally, one of the positive and negative source voltages may stabilize faster than the other one of the positive and negative source voltages after the power source means is turned on, and the adjusting means may control supply of the faster one of the positive and negative source voltages so that the reference voltage falls into a predetermined allowable range.

The power source means may comprise a first power source circuit and a second power source circuit, the first power source circuit outputting one of the positive and negative source voltages, the second power source circuit outputting the other one of the positive and negative source voltages in response to the one of the positive and negative source voltages; the adjusting means allowing the one of the positive and negative source voltages to be supplied to the signal processing circuit after the second power source circuit is turned on, the second power source circuit being turned on after the first power source circuit is turned on.

Additionally, the power source control circuit according to the present invention may comprise alarm signal generating means for generating an alarm signal when the reference voltage is out of a predetermined allowable range. Further, the power source control circuit may comprise means for stopping an operation of the power source means in response to the alarm signal.

There is provided according to another aspect of the present invention a memory apparatus comprising:

power source means for outputting a positive source voltage and a negative source voltage;

a recording medium provided with an intermediate electric potential between the positive source voltage and the negative source voltage;

a head reading information on the recording medium;

a signal processing circuit providing the intermediate electric potential to the head; and a power source control circuit driving the signal processing circuit by supplying the positive and negative source voltages to the signal processing circuit, the power source control circuit comprising:

a first circuit for providing the positive and negative source voltages to the signal processing circuit; and a second circuit for controlling one of the positive and negative source voltages in response to a reference voltage fed back from the signal processing circuit, the reference voltage being provided from the signal processing circuit to the head for setting the head at the intermediate electric potential.

According to the above-mentioned memory apparatus, the electric potential of the head is set accurately to a predetermined voltage corresponding to the intermediate electric potential (zero volts) even if characteristics of each power source circuit corresponding to the power source means and each signal processing circuit is different from one another due to their allowable manufacturing tolerances. Additionally, the reference voltage provided to the head can be accurately set to a predetermined voltage corresponding to the intermediate electric potential (zero volts) even if the characteristics of each power source circuit corresponding to the power source means and each signal processing circuit slightly change as time elapses. As a result, a generation of a spark between the head and the recording medium which is set at the intermediate electric potential is prevented. Thus, a reliable operation of the memory apparatus can be assured.

The above-mentioned memory apparatus may further comprise adjusting means for controlling a timing for supplying the positive source voltage and the negative source voltage to the signal processing circuit. One of the positive and negative source voltages may stabilize faster than the other one of the positive and negative source voltages after the power source means is turned on, and the adjusting means may allow the faster one of the positive and negative source voltages to be supplied to the signal processing circuit after the other one of the positive and negative source voltages falls into a predetermined range. Additionally, the adjusting means may gradually raise the faster one of the positive and negative source voltages when the faster one of the positive and negative source voltages is supplied to the signal processing circuit.

Additionally, one of the positive and negative source voltages may be stabilized faster than the other one of the positive and negative source voltages after the power source means is turned on, and the adjusting means may control supply of the faster one of the positive and negative source voltages so that the reference voltage falls into a predetermined allowable range.

Further, the power source means may comprise a first power source circuit and a second power source circuit, the first power source circuit outputting one of the positive and negative source voltages, the second power source circuit outputting the other one of the positive and negative source voltages in response to the one of the positive and negative source voltages; and the adjusting means which allows the one of the positive and negative source voltages to be supplied to the signal processing circuit after the second power source circuit is turned on, the second power source circuit being turned on after the first power source circuit is turned on.

The memory apparatus according to the present invention may comprise alarm signal generating means for generating an alarm signal when the reference voltage is out of a predetermined allowable range. Further, the memory apparatus may comprise means for stopping an operation of the power source means in response to the alarm signal.

In one embodiment of the memory apparatus according to the present invention, the head is a magnetoresistive head, and the recording medium is a magnetic disk.

Other objects, features and advantages of the present invention will become more apparent from the following detailed description when read in conjunction with the accompanying drawings.

DETAILED DESCRIPTION OF THE PREFERRED EMBODIMENTS

Figure 1:
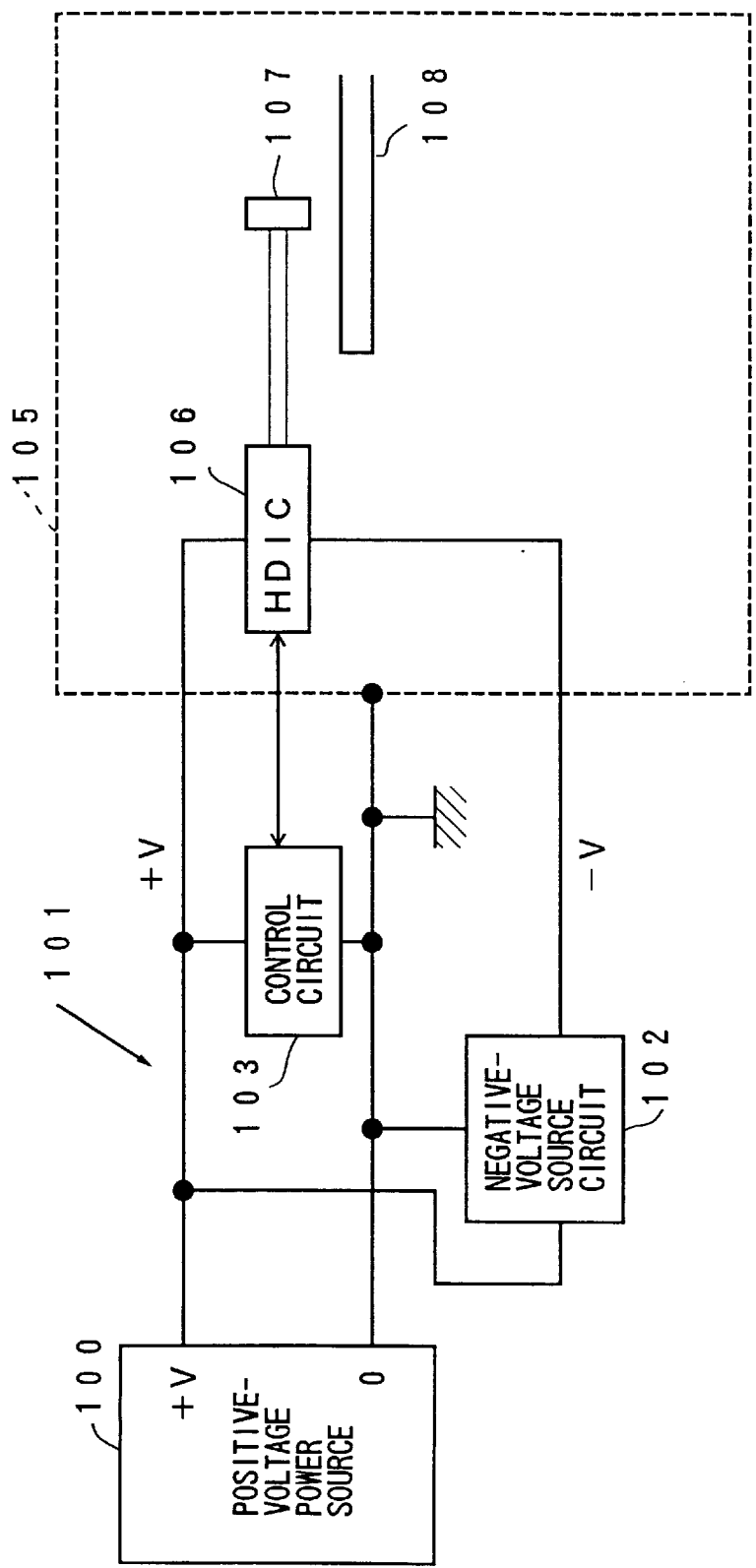
FIG. 1 is a block diagram of a disk drive apparatus having a power source control circuit using a conventional method.
Figure 2:
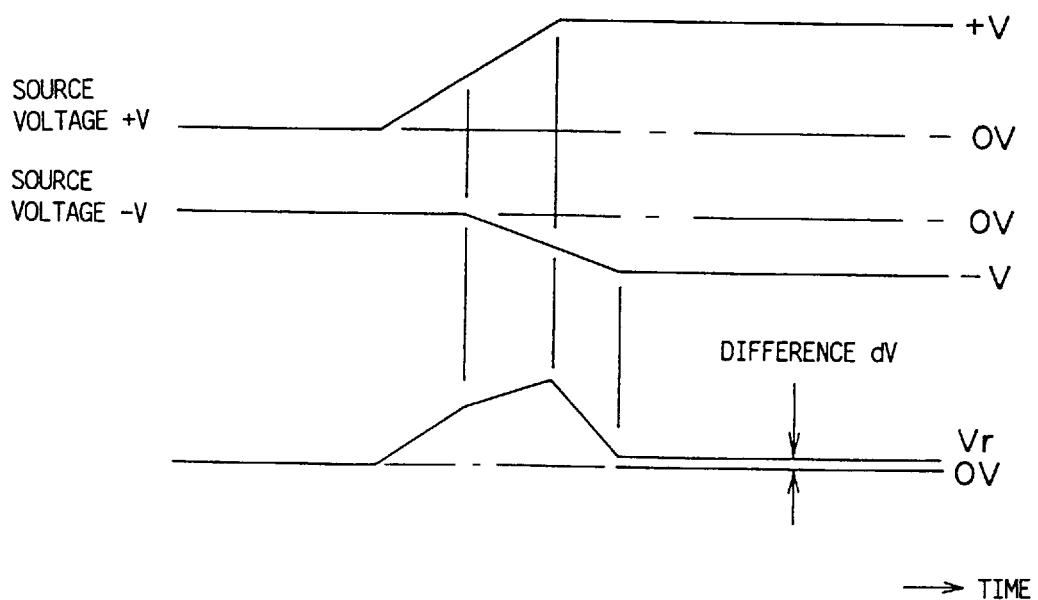
FIG. 2 is a diagram for showing a relationship between a positive source voltage, a negative source voltage and a reference voltage which are used in the power source control circuit shown in FIG. 1.
Figure 3:
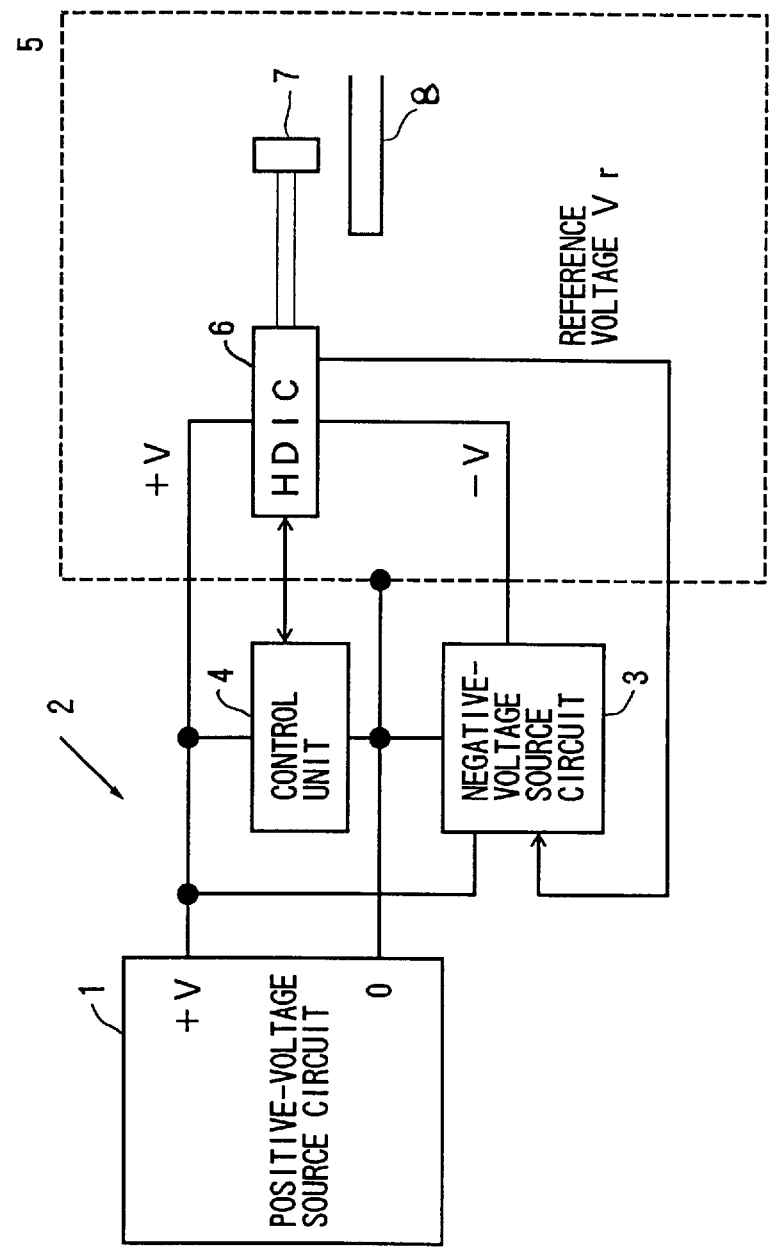
FIG. 3 is a block diagram of a magnetic disk apparatus according to a first embodiment of the present invention.

A description will now be given, with reference to FIG. 3, of a first embodiment of the present invention. FIG. 3 is a block diagram of a power source control circuit of a magnetic disk apparatus according to the first embodiment of the present invention.

The magnetic disk apparatus shown in FIG. 3 comprises a positive-voltage source circuit 1, a power source control circuit 2 and a disk enclosure 5. The power source control circuit 2 comprises a negative-voltage source circuit 3 and a control unit 4. The control unit 4 is comprised of, for example, a central processing unit (CPU). The disk enclosure 5 comprises a head IC (HDIC) 6, a MR head 7 and a magnetic disk 8. The HDIC 6 is provided with a positive source voltage +V from the positive-voltage source circuit 1 and a negative source voltage −V from the negative-voltage source circuit 3. The HDIC 6 is a kind of signal processing circuit which interfaces between the control unit 4 and the MR head 7.

The MR head 7 is used as a read head. A write head, also provided in the magnetic disk, is not shown in the figure. Additionally, although a plurality of magnetic disks and magnetic heads may be provided in the magnetic disk apparatus, the single magnetic disk 8 and the single MR head 7 are shown in the figure for the purpose of simplification. Further, a mechanism for driving the magnetic head and a mechanism for rotating the magnetic disk 8 are known in the art, parts related to such mechanisms are not shown in the figure.

The control unit 4 receives an output of the MR head 7 via the HDIC 6, and sends to the MR head 7 various commands such as a write command. The HDIC 6 supplies to the MR head 7 a current used for reading information on the magnetic disk 8. The HDIC 6 also performs amplification of the output of the MR head 7 and a processing of signals for a writing operation.

In this case, the electric potential of the MR head 7 is set to zero volts which corresponds to the ground potential, and the magnetic disk 8 is also set to the ground potential which is equal to zero volts. A positive power source voltage +V is provided to the HDIC 6 by the positive-voltage source circuit 1. A negative source voltage −V is provided to the HDIC 6 by the negative-voltage source circuit 3. A reference voltage Vr is provided to the negative-voltage source circuit 3. The negative-voltage source circuit 3 controls the negative source voltage −V provided to the HDIC 6 so that the reference voltage Vr provided by the HDIC 6 becomes zero volts.

Figure 4:
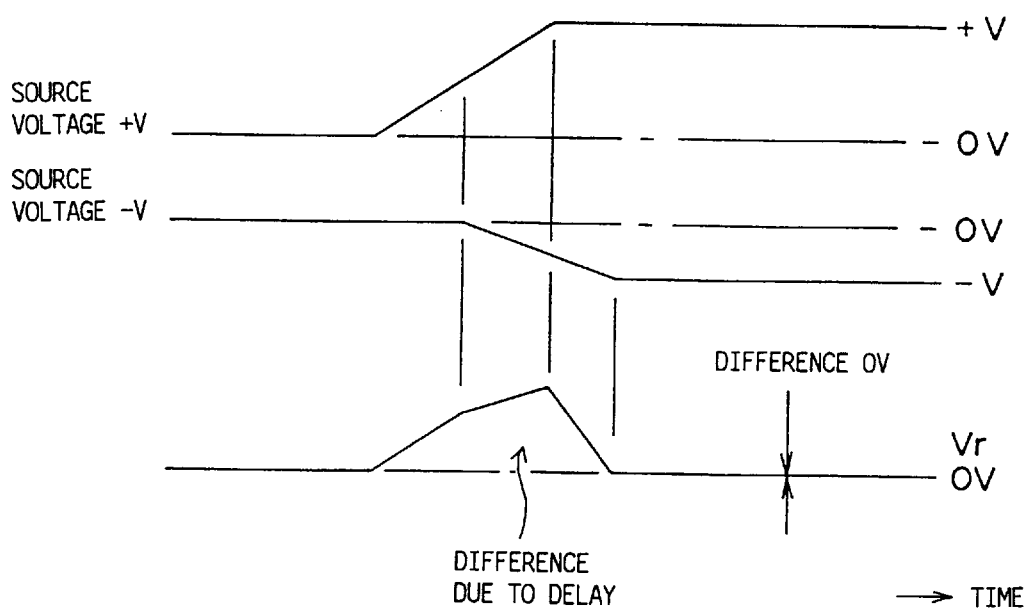
FIG. 4 is a diagram for showing a relationship between a positive power source voltage, a negative source voltage and a reference voltage which are used in the power source control circuit shown in FIG. 3.

FIG. 4 is a diagram for showing a relationship between the positive power source voltage +V, the negative source voltage −V and the reference voltage Vr in the present embodiment. The reference voltage Vr is the voltage actually provided to the MR head 7. The reference voltage Vr is a sum of the positive power source voltage +V and the negative source voltage −V. As shown in FIG. 4, the electric potential of the MR head 7 is set accurately to zero volts which corresponds to the ground potential even if characteristics of each negative-voltage source circuit 3 and each HDIC 6 is different from one another due to their allowable manufacturing tolerances. Additionally, the voltage actually provided to the MR head 7 can be accurately set to zero volts even if the characteristics of the negative-voltage source circuit 3 and the HDIC 6 slightly changes as time elapses. As a result, a generation of a spark between the MR head 7 and the magnetic disk 8 is prevented. Thus, a reliable operation of the magnetic disk apparatus can be assured.

Figure 5:
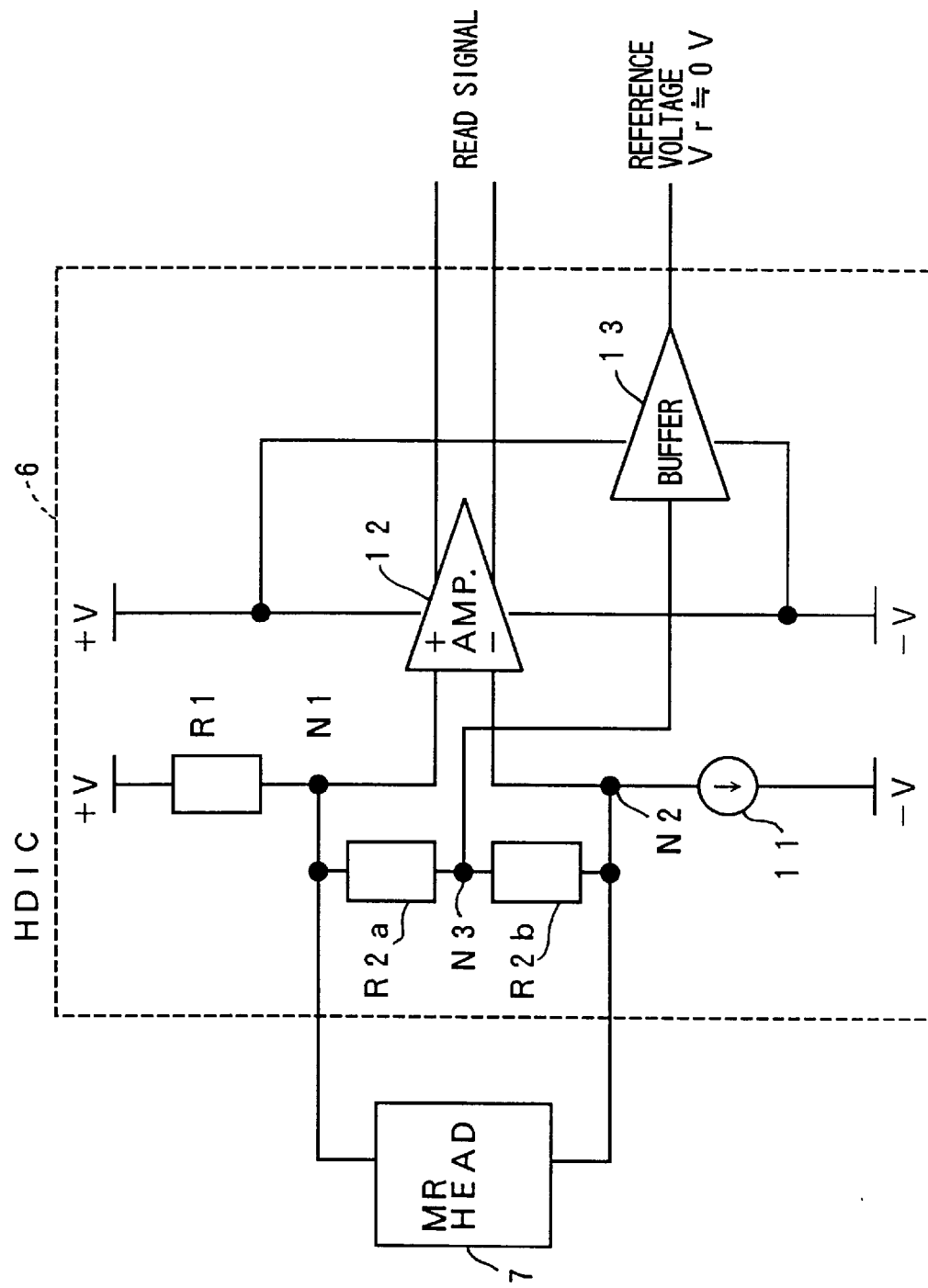
FIG. 5 is a circuit diagram of an HDIC shown in FIG. 3.

FIG. 5 is a circuit diagram of the HDIC 6 shown in FIG. 3. The HDIC 6 comprises resistors R1, R2a and R2b, a constant-current source 11, an amplifier 12 and a buffer 13 which are connected as shown in FIG. 5. The resistor R1 is connected between the positive-voltage source circuit 1 and a node N1. The resistors R2a and R2b are connected in parallel between the node N1 and a node N2. The MR head 7 is connected to the nodes N1 and N2. The amplifier 12 amplifies signals from the nodes N1 and N2 so as to output a read signal. The constant-current source 11 is connected between the node N2 and the negative-voltage source circuit 3. The amplifier 12 and the buffer 13 are connected between the positive-voltage source circuit 1 and the negative-voltage source circuit 3, respectively.

The buffer 13 is provided with a signal from a node N3 which is between the resistors R2a and R2b so that the buffer 13 outputs the reference voltage Vr which is an intermediate voltage between the positive power source voltage +V and the negative source voltage −V. The reference voltage Vr is supplied to the negative-voltage source circuit 3. The reference voltage Vr is controlled to become equal to zero volts by the negative-voltage source circuit 3 as explained later.

Figure 6:
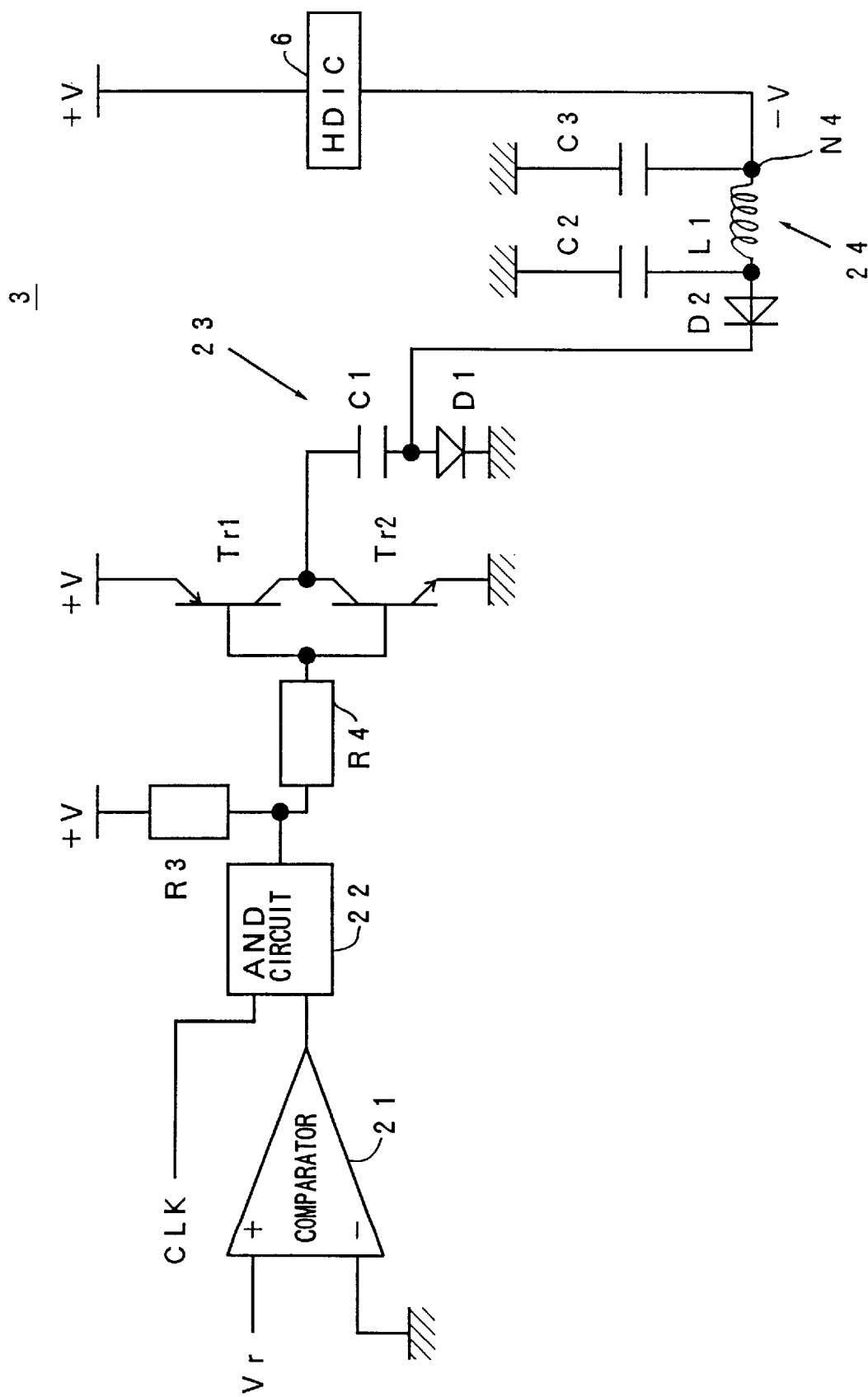
FIG. 6 is a circuit diagram of a negative-voltage source circuit shown in FIG. 3.

FIG. 6 is a circuit diagram of the negative-voltage source circuit 3 shown in FIG. 3. The negative-voltage source circuit 3 comprises a comparator 21, an AND circuit 22, a voltage generating circuit 23 and a filter circuit 24 which are connected as shown in FIG. 6. The voltage generating circuit 23 utilizes a so-called charge pump and comprises resistors R3 and R4, transistors Tr1 and Tr2, capacitors C1 and C2 and diodes D1 and D2. The filter circuit 24 comprises a capacitor C3 and a coil L1.

The reference voltage Vr is input from the HDIC 6 to a non-inverting input terminal of the comparator 21. An inverting input terminal of the HDIC 6 is grounded. The output of the comparator 21 becomes a positive voltage value when the reference voltage is greater than zero volts. The output of the comparator 21 becomes a negative voltage value when the reference voltage Vr is less than zero volts. The output of the comparator 21 is input to the AND circuit 22 which is provided with a clock signal CLK. An output of the AND circuit 22 goes through the voltage generating circuit 23 and the filter circuit 24 so that a stable and accurately controlled negative source voltage −V is output to a node N4. The negative source voltage −V is supplied to the HDIC 6.

Figure 7:
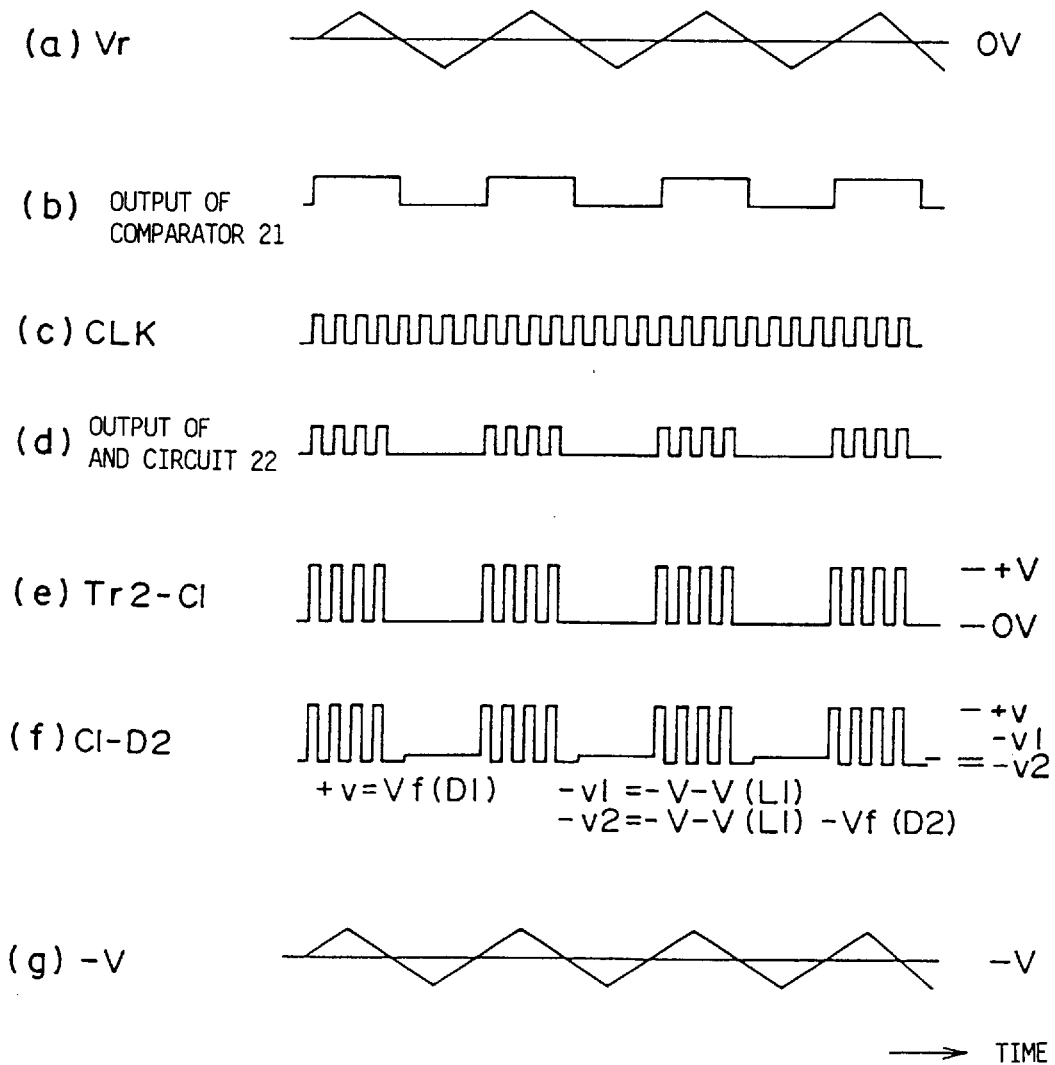
FIG. 7 is a time chart of waveforms at each part of the circuit shown in FIG. 6.

FIG. 7 is a time chart of waveforms at each part of the circuit shown in FIG. 6. FIG. 7(a) shows the waveform of the reference voltage Vr; FIG. 7(b) shows the waveform of the output of the comparator 21; FIG. 7(c) shows the waveform of the clock signal CLK; FIG. 7(d) shows the waveform of the output of the AND circuit 22; FIG. 7(e) shows the waveform at a node between the transistor Tr1 and the capacitor C1; FIG. 7(f) shows the waveform at a node between the capacitor C1 and the diode D2; FIG. 7(g) shows the waveform of the negative source voltage −V. It should be noted that, in FIG. 7(f), +V=Vf(D1), −V1=−V−V(L1) and −V2=−V−V(L1)−Vf(D2), where Vf(D1) is a voltage across the terminals of the diode D1 and Vf(D2) is a voltage across the terminals of the diode D2. That is, the AND circuit 22 controls the supply of the clock signal CLK to the voltage generating circuit 23 in response to a value of the reference voltage Vr as to whether it is greater or less than the original zero volts. Accordingly, the voltage generating circuit 23 charges or discharges the capacitors C1 and C2 in response to the value of the reference voltage Vr so that the negative source voltage −V output from the node C4 renders the reference voltage Vr to become equal to zero volts. It should be noted that the value of the negative source voltage −V can be controlled by setting the frequency of the clock signal CLK and the capacity of each of the capacitors C1 and C2 to appropriate values. Specifically, the frequency of the clock signal CLK and the capacity of each of the capacitors C1 and C2 are determined in response to the current consumed by the HDIC 6. That is, if the current consumed by the HDIC 6 has a relatively high value, the frequency of the clock signal CLK and the capacity of each of the capacitors C1 and C2 are set to relatively high values. On the other hand, if the current consumed by the HDIC 6 has a relatively low value, the frequency of the clock signal CLK and the capacity of each of the capacitors C1 and C2 are set to relatively low values.

Figure 8:
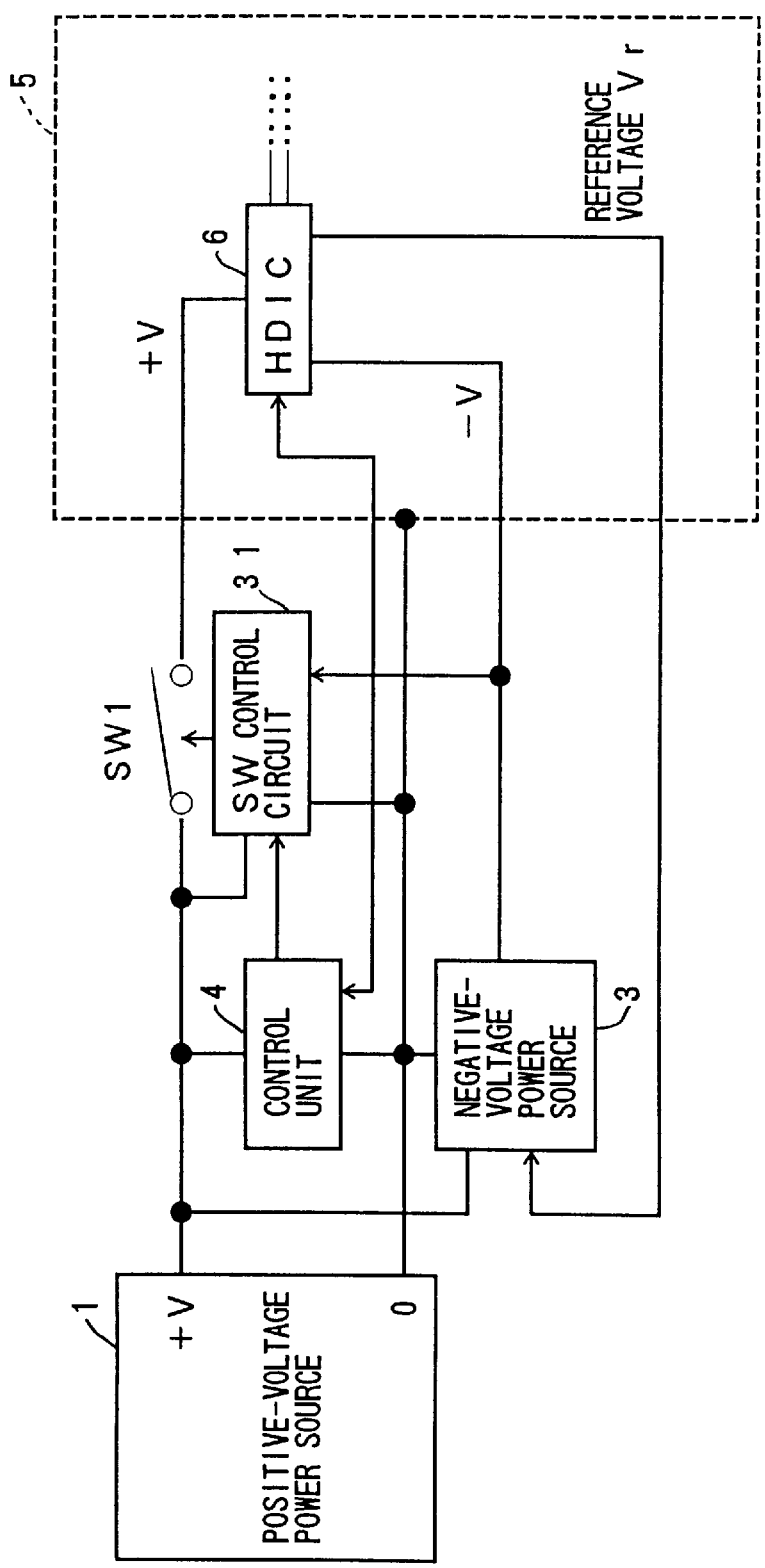
FIG. 8 is a block diagram of a magnetic disk apparatus according to a second embodiment of the present invention.

A description will now be given of a second embodiment of the present invention. FIG. 8 is a block diagram of a magnetic disk apparatus according to the second embodiment of the present invention. In FIG. 8, parts that are the same as the parts shown in FIG. 3 are given the same reference numerals, and descriptions thereof will be omitted.

In the second embodiment, a switch SW1 and a switch control circuit 31 are added to the structure of the first embodiment. There is a time delay between the time when the positive-voltage source circuit 1 is turned on and the time when the negative-voltage source circuit is turned on. In this case, since a time period necessary for the negative source voltage −V to be stabilized is longer than a time period needed for the positive source voltage +V to be stabilized, there is a possibility that a difference in electric potential is generated between the MR head 7 and the magnetic disk 8. In order to eliminate the possible problem due to such a potential difference, the time period for stabilizing the positive source voltage +V is set equal to the time for stabilizing the negative source voltage −V. This is achieved by opening the switch SW1 for the period starting from when the positive-voltage source circuit 1 is turned on until the negative-voltage source circuit 3 is turned on by the switch control circuit 31.

Figure 9:
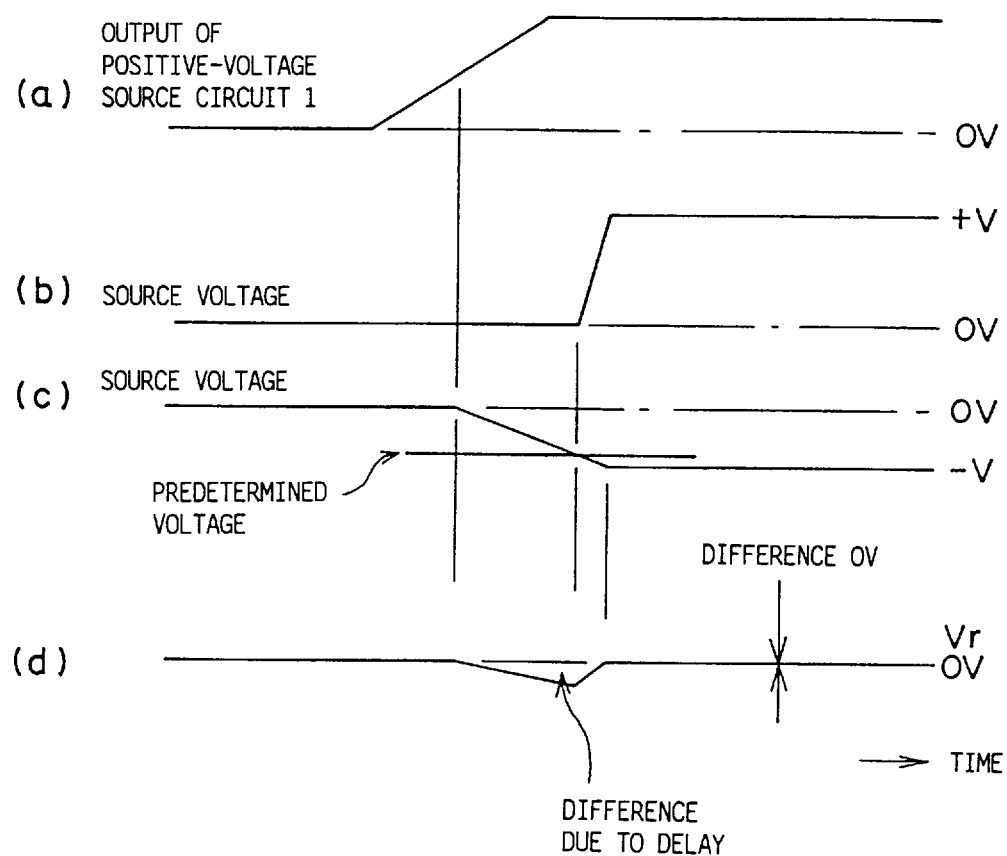
FIG. 9 is a time chart showing signal waveforms at each part in the circuit shown in FIG. 8.

FIG. 9 is a time chart showing signal waveforms at each part in the circuit shown in FIG. 8. FIG. 9(a) shows the output of the positive-voltage source circuit 1; FIG. 9(b) shows the positive source voltage +V supplied to the HDIC 6; FIG. 9(c) shows the negative source voltage −V supplied to the HDIC 6; FIG. 9(d) shows the reference voltage Vr.

Figure 10:
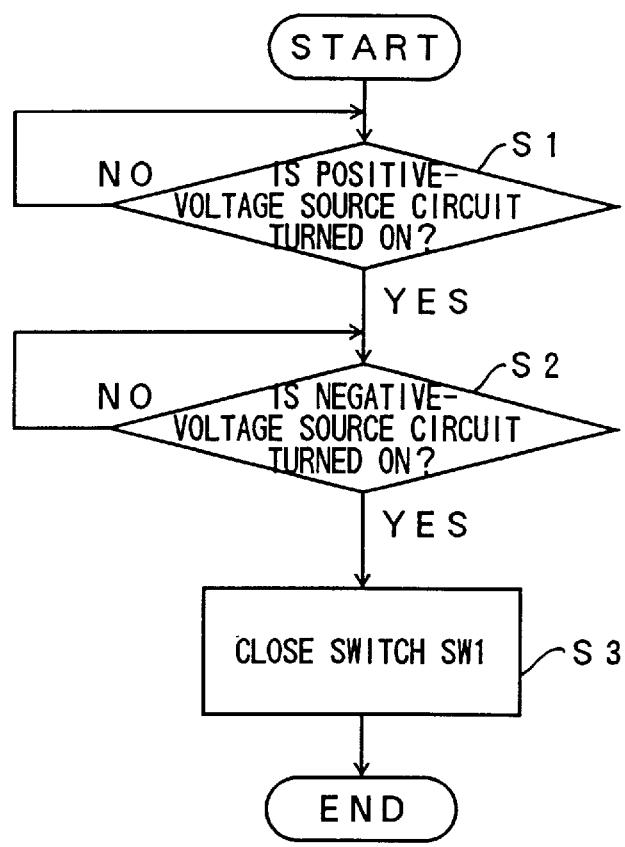
FIG. 10 is a flowchart for explaining an operation of a switch control circuit shown in FIG. 8.

FIG. 10 is a flowchart for explaining an operation of the switch control circuit 31 shown in FIG. 8. When the operation shown in FIG. 10 is started, it is determined, in step S1, whether or not the positive-voltage source circuit 1 is turned on. If it is determined that the positive-voltage source circuit 1 is turned on, the routine proceeds to step S2. In step S2, it is determined whether or not the negative-voltage source circuit 3 is turned on. If it is determined that the negative-voltage source circuit 3 is turned on, the routine proceeds to step S3. In step S3, the switch SW1, which is normally open, is closed, and the routine is ended.

Figure 11:
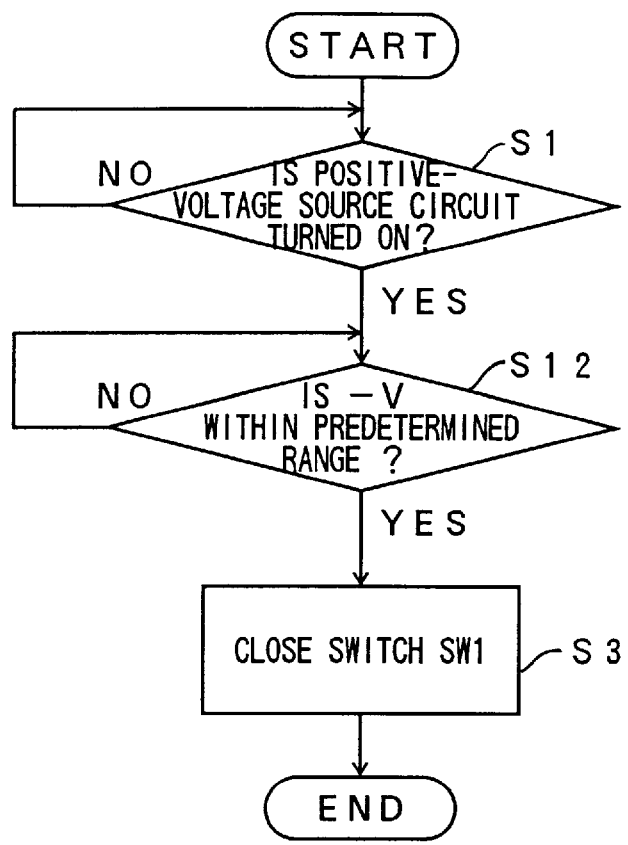
FIG. 11 is a flowchart for explaining an operation of the switch control circuit shown in FIG. 8.

The switch control circuit 31 can set the time when the positive source voltage +V is stabilized equal to the time when the negative source voltage −V is stabilized. This is achieved by opening the switch SW1 for the period starting from when the positive-voltage source circuit 1 is turned on until the negative-voltage source circuit 3 is turned on by the switch control circuit 31. FIG. 11 is a flowchart of an operation of the switch control circuit 31 to achieve this operation.

When the operation shown in FIG. 11 is started, it is determined, in step S1, whether or not the positive-voltage source circuit 1 is turned on. If it is determined that the positive-voltage source circuit 1 is turned on, the routine proceeds to step S12. In step S12, it is determined whether or not the negative source voltage −V output from the negative-voltage source circuit 3 falls within a predetermined range. If it is determined that the negative source voltage −V falls within the predetermined range, the routine proceeds to step S3. In step S3, the switch SW1, which is normally open, is closed, and the routine is ended.

In the above-mentioned second embodiment, the operation of the switch control circuit 31 may instead be performed by the control unit 4. In this case, the switch control circuit 31 can be omitted, and the negative source voltage −V output from the negative-voltage source circuit 3 is supplied to the control unit 4. Thus, the switch SW1 is directly controlled by a signal output from the control unit 4.

Figure 12:
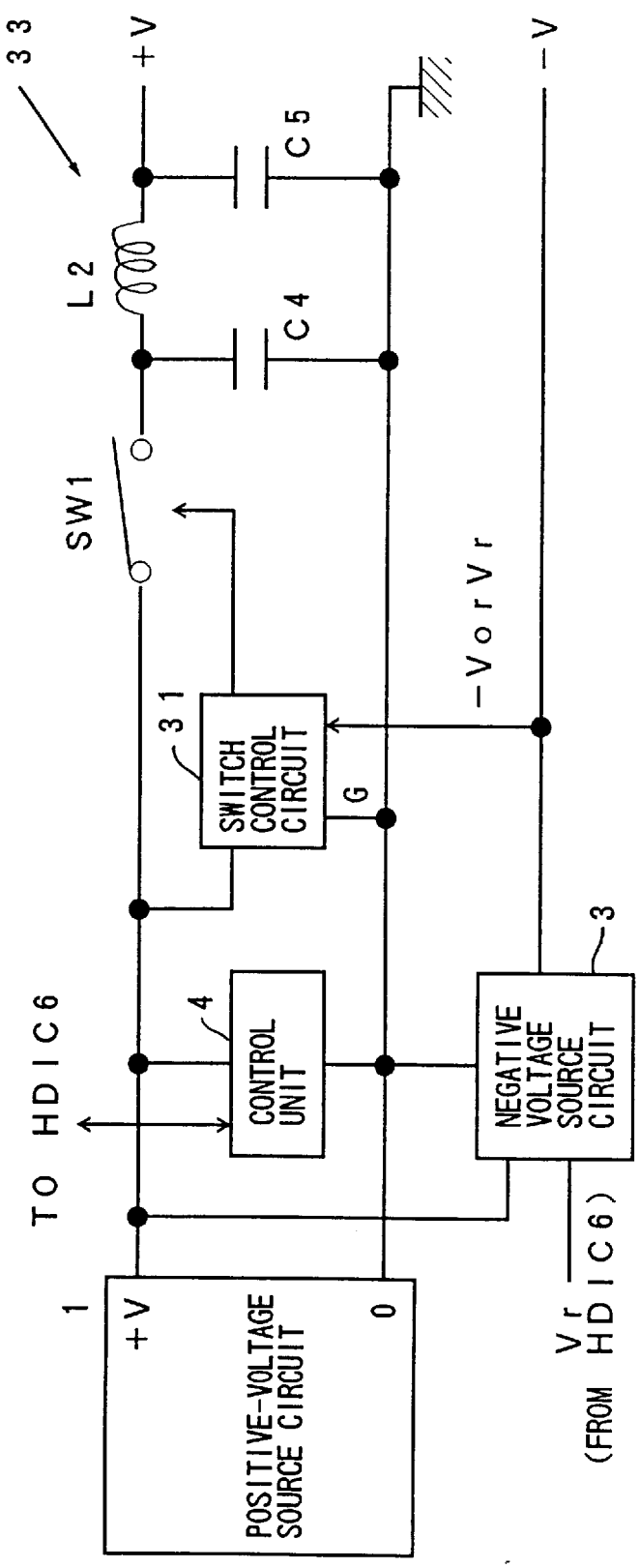
FIG. 12 is a block diagram of a magnetic disk apparatus according to a third embodiment of the present invention.

A description will now be given of a third embodiment of the present invention. FIG. 12 is a block diagram of a magnetic disk apparatus according to the third embodiment of the present invention. In FIG. 12, parts that are the same as the parts shown in FIG. 8 are given the same reference numerals, and descriptions thereof will be omitted.

In the third embodiment, a filter circuit 33 is added to the structure of the above-mentioned second embodiment. The filter circuit 33 comprises capacitors C4 and C5 and a coil L2. The switch control circuit 31 monitors the negative source voltage −V output from the negative-voltage source circuit 3 from the time when the positive-voltage source circuit 1 is turned on. The switch control circuit 31 turns on/off the switch SW1 when the negative source voltage −V falls into a predetermined range. Monitor voltages are set stepwisely beforehand so that the switch SW1 is turned on/off to raise the positive source voltage +V each time when the negative source voltage −V falls into the predetermined range. According to this operation, the time when the positive source voltage +V is stabilized is set to be equal to the time when the negative source voltage −V is stabilized. That is, the positive source voltage +V gradually rises at a rate equal to the rising rate of the negative source voltage −V by being passed through the filter circuit 33. When a predetermined period T1 has been elapsed, the switch SW1 is turned on.

Figure 13:
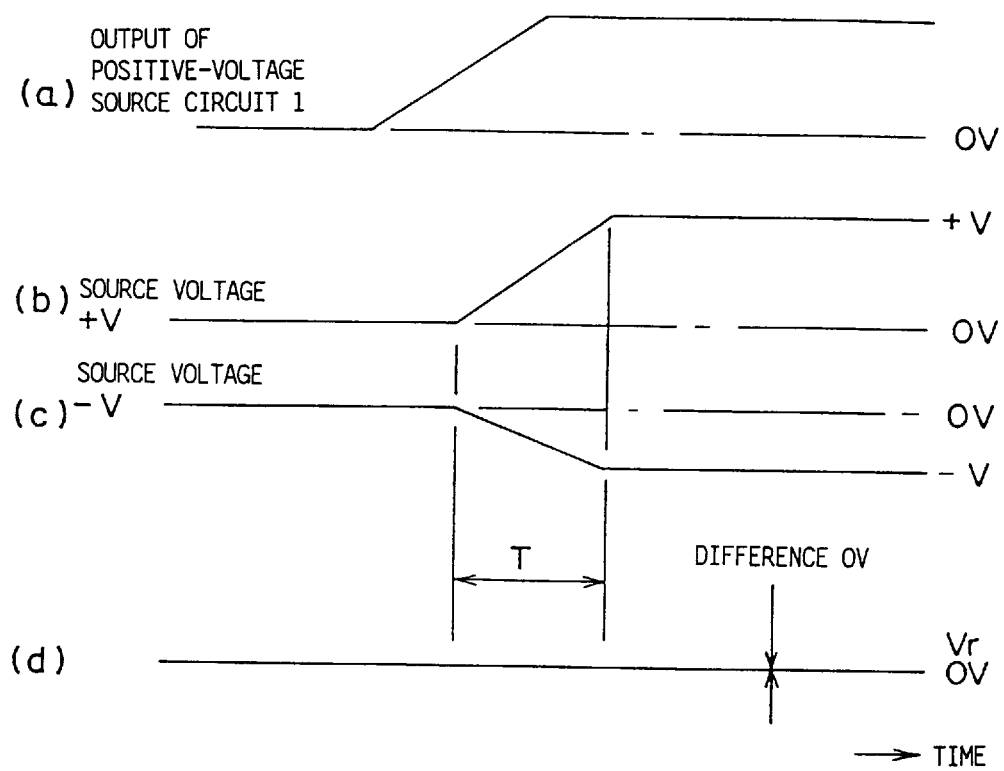
FIG. 13 is a time chart showing signal waveforms at each part in the circuit shown in FIG. 12.

FIG. 13 is a time chart showing signal waveforms at each part in the circuit shown in FIG. 12. FIG. 13(a) shows the output of the positive-voltage source circuit 1; FIG. 13(b) shows the positive source voltage +V supplied to the HDIC 6; FIG. 13(c) shows the negative source voltage −V supplied to the HDIC 6; FIG. 13(d) shows the reference voltage Vr. In FIG. 13, a time period T corresponds to the above-mentioned predetermined period T1.

Figure 14:
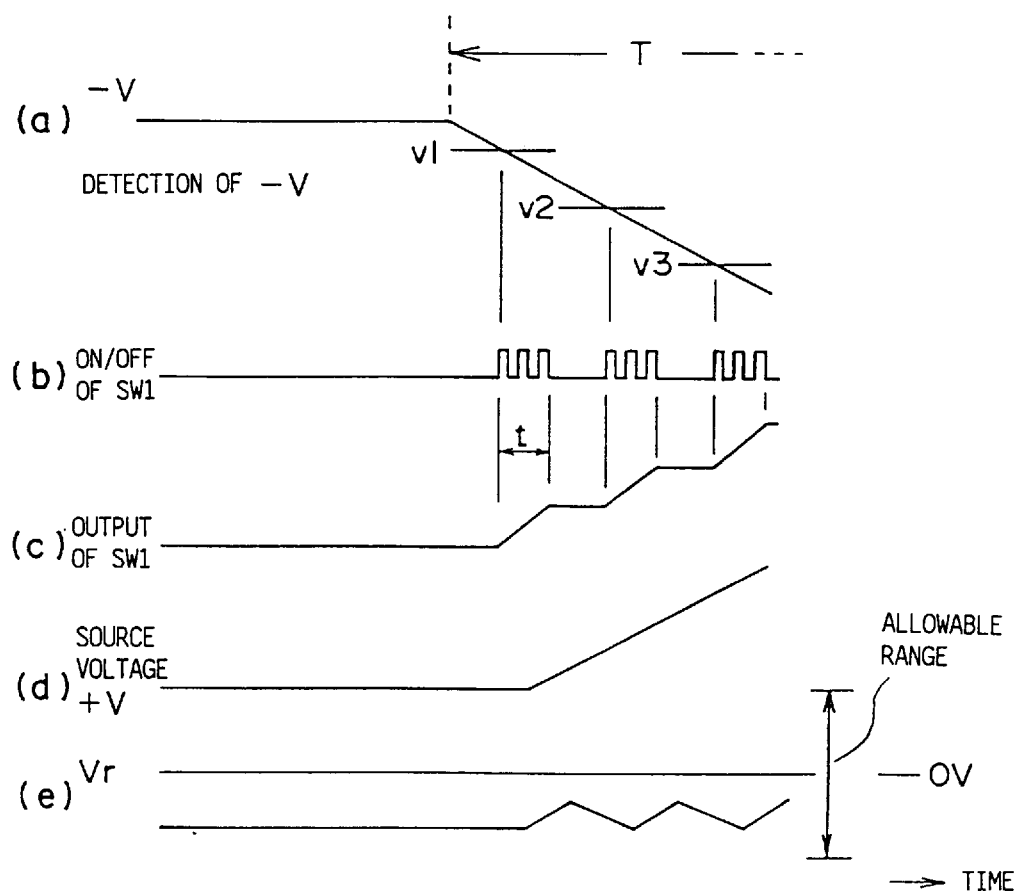
FIG. 14 is an enlarged time chart for explaining a part of the time chart shown in FIG. 13.
Figure 15:
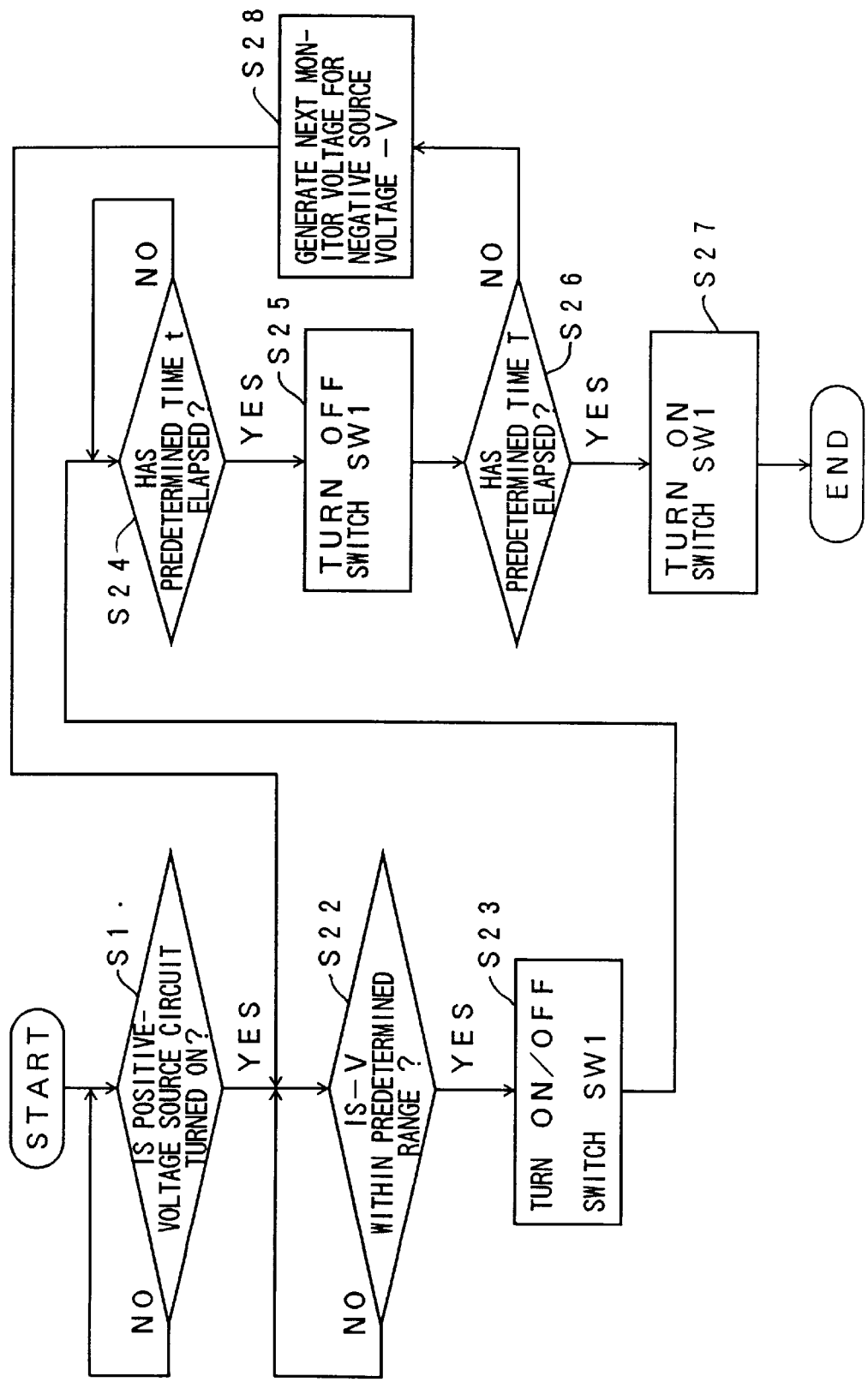
FIG. 15 is a flowchart of an operation of the switch control circuit shown in FIG. 12.

FIG. 14 is an enlarged time chart for explaining a part of the time chart shown in FIG. 13. FIG. 14(a) shows the negative source voltage −V; FIG. 14(b) shows an on/off signal supplied from the switch control circuit 31 to the switch SW1; FIG. 14(c) shows the output of the switch SW1; FIG. 14(d) shows the positive source voltage +V supplied to the HDIC 6; FIG. 14(e) shows the reference voltage Vr supplied from the HDIC 6. In FIG. 14, each of ranges v1, v2 and v3 corresponds to a predetermined range v into which the negative source voltage −V falls. Additionally, t indicates a time period during which the switch SW1 is turned on/off. FIG. 15 is a flowchart of an operation of the switch control circuit 31 when the above-mentioned control of the reference voltage Vr is performed.

When the operation shown in FIG. 15 is started, it is determined, in step S1, whether or not the positive-voltage source circuit 1 is turned on. If it is determined that the positive-voltage source circuit 1 is turned on, the routine proceeds to step S22. In step S22, it is determined whether or not the negative source voltage −V output from the negative-voltage source circuit 3 falls into the predetermined range v (v1, v2, v3). If it is determined that the negative source voltage −V falls within the predetermined range v, the routine proceeds to step S23. In step S23, the switch SW1, which is normally open, is repeatedly turned on and off.

Then, it is determined, in step S24, whether or not the predetermined period t has elapsed. If it is determined that the predetermined period t has elapsed, the routine proceeds to step S25. In step S25, the switch SW1 is turned off (open). It is then determined, in step S26, whether or not the predetermined period T has elapsed. If it is determined that the predetermined period T has elapsed, the routine proceeds to step S27. In step S27, the switch SW1 is turned on (closed), and the routine is ended. On the other hand, if it is determined, in step S26, that the predetermined period T has not elapsed, the routine proceeds to step 28. In step S28, the next monitor voltage for the negative source voltage −V is generated or determined, and then the routine returns to step S22.

The switch control circuit 31 may monitor the reference voltage Vr fed back from the HDIC 6 so as to repeatedly turn the switch SW1 on and off so that the reference voltage Vr falls into a predetermined range. In this case, the reference voltage Vr may be supplied to the switch control circuit 31 from the HDIC 6. However, in this embodiment, the reference voltage Vr is supplied to the switch control circuit 31 via the negative-voltage source circuit 3. Thus, the time when the positive source voltage +V obtained through the filter circuit 33 is stabilized can be set to be equal to the time when the negative source voltage −V is stabilized.

Figure 16:
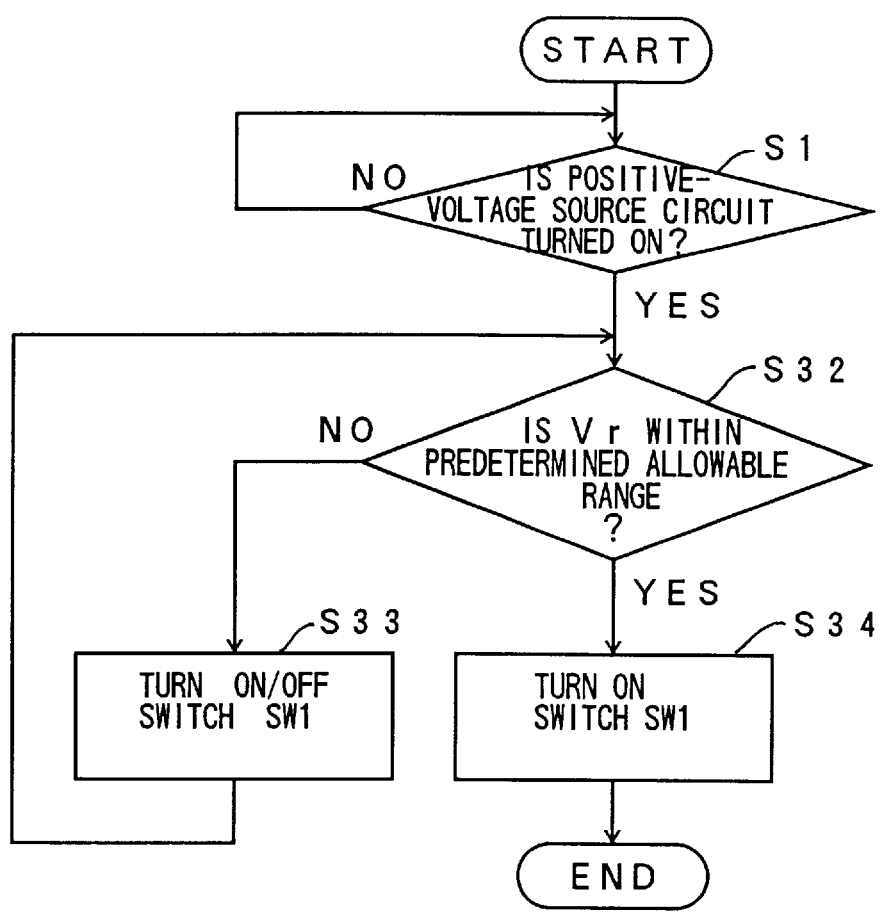
FIG. 16 is a flowchart of an operation performed by the switch control circuit shown in FIG. 13.

FIG. 16 is a flowchart of an operation performed by the switch control circuit 31 in the third embodiment. When the operation shown in FIG. 16 is started, it is determined, in step S1, whether or not the positive-voltage source circuit 1 is turned on. If it is determined that the positive-voltage source circuit 1 is turned on, the routine proceeds to step S32. In step S32, it is determined whether or not the reference voltage Vr supplied by the HDIC 6 falls into the predetermined allowable range. If it is determined that the reference voltage Vr falls within the predetermined allowable range, the routine proceeds to step S34. In step S34, the switch SW1, which is normally open, is turned on, and the routine is ended. On the other hand, if it is determined, in step 32, that the reference voltage Vr does not fall within the predetermined allowable range, the routine proceeds to step S33. In step S33, the switch SW1, which is normally open, is repeatedly turned on and off. Then, the routine returns to step S32.

In the above mentioned third embodiment, the operation of the switch control circuit 31 may instead be performed by the control unit 4. In this case, the switch control circuit 31 can be omitted, and the reference voltage Vr is supplied from the HDIC 6 to the control unit 4. Thus, the switch SW1 is directly controlled by a signal output from the control unit 4. Additionally, the on/off operation of the switch SW1 may be controlled by a combination of the operations shown in FIGS. 15 and 16.

Figure 17:
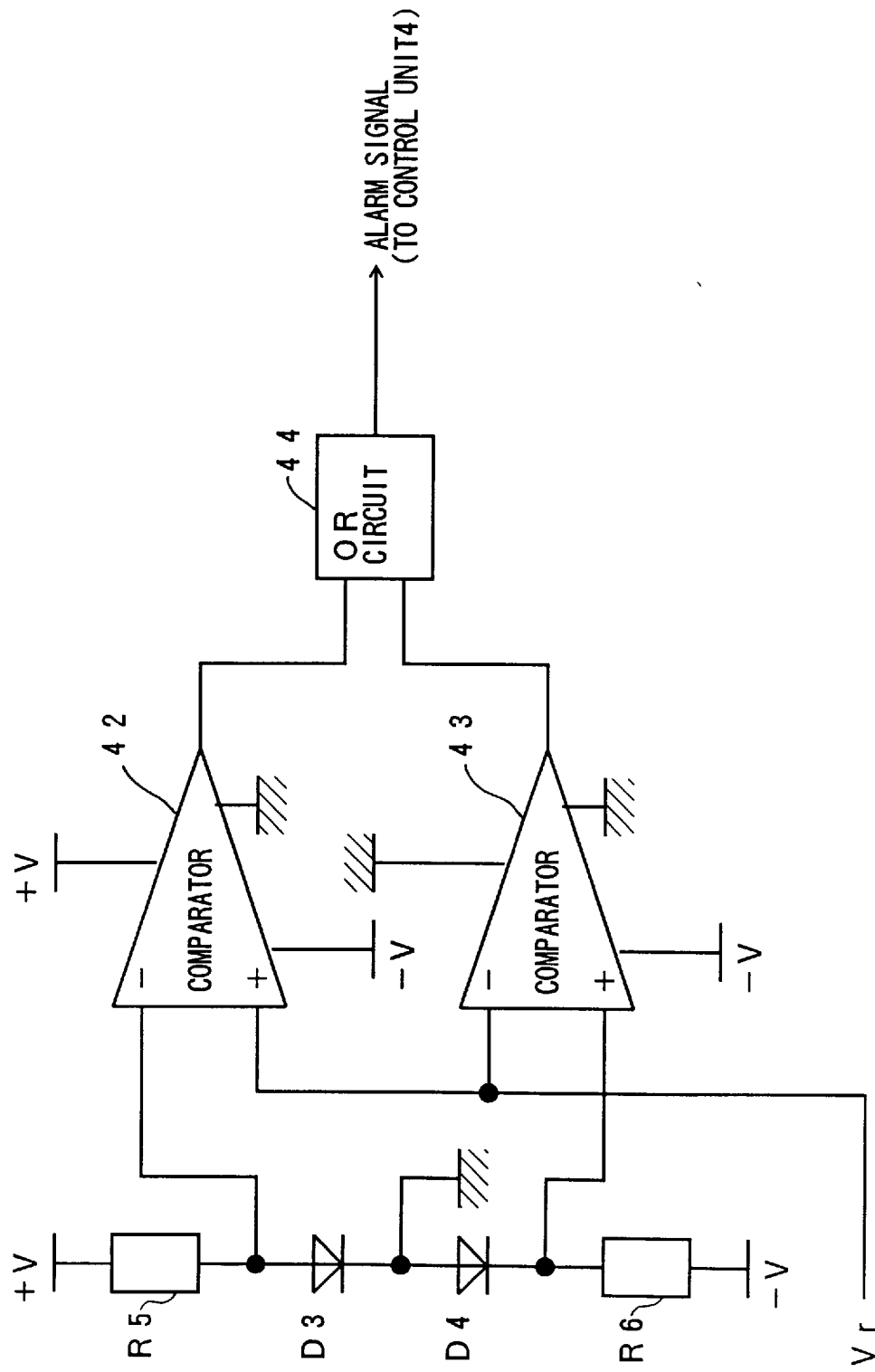
FIG. 17 is a circuit diagram of an alarm signal generating circuit provided in a magnetic disk apparatus according to a fourth embodiment of the present invention.

A description will now be given of a fourth embodiment of the present invention. FIG. 17 is a circuit diagram of an alarm signal generating circuit 41 provided in a magnetic disk apparatus according to the fourth embodiment of the present invention. It should be noted that the magnetic disk apparatus according to the fourth embodiment has the same construction as that of the above-mentioned first to third embodiments except for the power source control circuit shown in FIG. 17. The alarm signal generating circuit 41 is provided in the power source control circuit.

The alarm signal generating circuit 41 comprises resistors R5 and R6, diodes D3 and D4, comparators 42 and 43 and an OR circuit 44 which are connected as shown in FIG. 17. The OR circuit 44 outputs an alarm signal when the reference voltage is out of the predetermined allowable range due to malfunctioning of the positive-voltage source circuit 1 or the negative-voltage source circuit 3 or short circuiting of a load. The alarm signal is supplied to the control unit 4. Accordingly, the control unit 4 forcibly stops the operation of at least the positive-voltage source circuit 1. In this case, a control signal is directly supplied from the control unit 4 to the positive-voltage source circuit 1 so as to forcibly stop the operation of the positive-voltage source circuit 1 when the alarm signal is generated.

It should be noted that, in the above-mentioned fourth embodiment, the function of the alarm signal generating circuit 41 may instead be provided in the control unit 4. In this case, the alarm signal generating circuit 41 can be omitted, and the reference voltage Vr is supplied directly from the HDIC 6 to the control unit 4.

Figure 18:
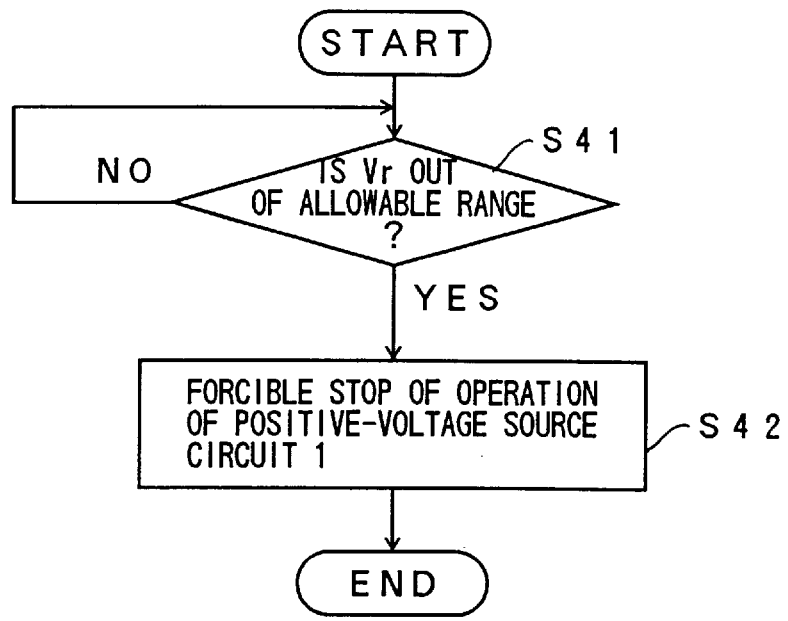
FIG. 18 is a flowchart of an operation performed by a control unit of the fourth embodiment.

FIG. 18 is a flowchart of an operation performed by the control unit 4 of the fourth embodiment when the alarm generating function is performed in the control unit 4. When the operation shown in FIG. 18 is started, it is determined, in step S41, whether or not the reference voltage Vr is out of the predetermined allowable range. That is, in step S41, it is determined whether or not the alarm signal is to be generated. If it is determined that the reference voltage is out of the allowable range, the routine proceeds to step S42. In step 42, the control signal is directly supplied to the positive-voltage source circuit 1 so as to forcibly stop the operation of the positive-voltage source circuit 1. At this time, the operation of the negative-voltage source circuit 3 may be forcibly stopped.

It should be noted that the above-mentioned function of the fourth embodiment may be applied to any one of the above-mentioned first to third embodiments. Additionally, in the first to fourth embodiments, the polarity of the power source circuits 1 and 3 may be reversed.

The present invention is not limited to the specifically disclosed embodiments, and variations and modifications may be made without departing from the scope of the present invention.

What is claimed is:

1. A power source control circuit for driving a signal processing circuit providing to a head an intermediate electrical potential between a positive source voltage and a negative source voltage supplied by power source means, said power source control circuit comprising:

a first circuit for providing said positive and said negative source voltages to said signal processing circuit; and a second circuit for controlling one of said positive and said negative source voltages in response to a reference voltage fed back from said signal processing circuit, said reference voltage being generated as a result of said positive and said negative source voltages being added together by said signal processing circuit, said reference voltage also being provided from said signal processing circuit to said head for setting said head at said intermediate electric potential.

2. The power source control circuit as claimed in claim 1, further comprising adjusting means for timing a supply of said positive source voltage and said negative source voltage to said signal processing circuit relative to each other.

3. The power source control circuit as claimed in claim 2, wherein one of said positive and negative source voltages is stabilized faster than the other one of said positive and negative source voltages after said power source means is turned on, and said adjusting means allows the faster one of said positive and negative source voltages to be supplied to said signal processing circuit after the other one of said positive and negative source voltages falls into a predetermined range.

4. The power source control circuit as claimed in claim 3, wherein said adjusting means gradually raises said faster one of said positive and negative source voltages when said faster one of said positive and negative source voltages is supplied to said signal processing circuit.

5. The power source control circuit as claimed in claim 2, wherein one of said positive and negative source voltages is stabilized faster than the other one of said positive and negative source voltages after said power source means is turned on, and said adjusting means controls supply of said faster one of said positive and negative source voltages so that said reference voltage falls into a predetermined allowable range.

6. The power source control circuit as claimed in claim 2, wherein said power source means comprises a first power source circuit and a second power source circuit, said first power source circuit outputting one of said positive and negative source voltages, said second power source circuit outputting the other one of said positive and negative source voltages in response to said one of said positive and negative source voltages; said adjusting means allowing said one of said positive and negative source voltages to be supplied to said signal processing circuit after said second power source circuit is turned on, said second power source circuit being turned on after said first power source circuit is turned on.

7. The power source control circuit as claimed in claim 1, further comprising alarm signal generating means for generating an alarm signal when said reference voltage is out of a predetermined allowable range.

8. The power source control circuit as claimed in claim 7, further comprising means for stopping an operation of said power source means in response to said alarm signal.

9. A memory apparatus comprising:

power source means for outputting a positive source voltage and a negative source voltage;

a recording medium provided with an intermediate electric potential between said positive source voltage and said negative source voltage;

a head for reading information on said recording medium;

a signal processing circuit providing said intermediate electric potential to said head; and a power source control circuit driving said signal processing circuit by supplying said positive and said negative source voltages to said signal processing circuit;

said power source control circuit comprising:

a first circuit for providing said positive and said negative source voltages to said signal processing circuit; and a second circuit for controlling one of said positive and said negative source voltages in response to a reference voltage fed back from said signal processing circuit, said reference voltage being generated as a result of said positive and said negative source voltages being added together by said signal processing circuit, said reference voltage also being provided from said signal processing circuit to said head for setting said head at said intermediate electric potential.

10. The memory apparatus as claimed in claim 9, further comprising adjusting means for timing a supply of said positive source voltage and said negative source voltage to said signal processing circuit relative to each other.

11. The memory apparatus as claimed in claim 10, wherein one of said positive and negative source voltages is stabilized faster than the other one of said positive and negative source voltages after said power source means is turned on, and said adjusting means allows the faster one of said positive and negative source voltages to be supplied to said signal processing circuit after the other one of said positive and negative source voltages falls into a predetermined range.

12. The memory apparatus as claimed in claim 11, wherein said adjusting means gradually raises said faster one of said positive and negative source voltages when said faster one of said positive and negative source voltages is supplied to said signal processing circuit.

13. The memory apparatus as claimed in claim 10, wherein one of said positive and negative source voltages is stabilized faster than the other one of said positive and negative source voltages after said power source means is turned on, and said adjusting means controls supply of said faster one of said positive and negative source voltages so that said reference voltage falls into a predetermined allowable range.

14. The memory apparatus as claimed in claim 10, wherein said power source means comprises a first power source circuit and a second power source circuit, said first power source circuit outputting one of said positive and negative source voltages, said second power source circuit outputting the other one of said positive and negative source voltages in response to said one of said positive and negative source voltages; and said adjusting means allows said one of said positive and negative source voltages to be supplied to said signal processing circuit after said second power source circuit is turned on, said second power source circuit being turned on after said first power source circuit is turned on.

15. The memory apparatus as claimed in claim 9, further comprising alarm signal generating means for generating an alarm signal when said reference voltage is out of a predetermined allowable range.

16. The memory apparatus as claimed in claim 15, further comprising means for stopping an operation of said power source means in response to said alarm signal.

17. The memory apparatus as claimed in claim 9, wherein said head is a magnetoresistive head, and said recording medium is a magnetic disk.

* * * * *